United States Patent [19]

D'Alfonso et al.

[11] Patent Number: 5,696,553

[45] Date of Patent: Dec. 9, 1997

[54] REMOTE IMAGER VIDEO CAMERA CABLE COMPENSATION CIRCUITRY

[75] Inventors: David A. D'Alfonso, Goleta; Jordan C. Christoff, Santa Barbara, both of Calif.

[73] Assignee: Bristol-Myers Squibb Co., New York, N.Y.

[21] Appl. No.: 393,284

[22] Filed: Feb. 23, 1995

Related U.S. Application Data

[63] Continuation of Ser. No. 951,123, Sep. 25, 1992, abandoned.

[51] Int. Cl.[6] .................................................. H04N 5/232
[52] U.S. Cl. ............................ 348/211; 348/312; 348/45
[58] Field of Search .............................. 348/207, 211, 348/213, 222, 45, 61, 505, 500, 294, 311, 312, 241; H04N 5/232

[56] References Cited

U.S. PATENT DOCUMENTS

| | | | |
|---|---|---|---|
| 4,667,230 | 5/1987 | Arakawa et al. | 358/98 |
| 4,706,118 | 11/1987 | Kato et al. | 358/98 |
| 4,803,562 | 2/1989 | Eino | 358/98 |
| 4,832,003 | 5/1989 | Yabe | 358/98 |
| 4,858,013 | 8/1989 | Matsuda | 358/213.17 |
| 4,860,095 | 8/1989 | Kimura et al. | 358/98 |
| 4,866,516 | 9/1989 | Hibino et al. | 358/98 |
| 4,893,185 | 1/1990 | Fukushima et al. | 358/213.17 |
| 4,918,521 | 4/1990 | Yabe et al. | 358/98 |
| 4,959,710 | 9/1990 | Uehara et al. | 358/98 |
| 4,989,094 | 1/1991 | Norita et al. | 358/213.19 |
| 5,007,407 | 4/1991 | Kikuchi | 128/6 |
| 5,010,395 | 4/1991 | Tsuji et al. | 358/44 |
| 5,022,383 | 6/1991 | Sakiyama et al. | 128/6 |
| 5,029,016 | 7/1991 | Hiyama et al. | 358/403 |
| 5,038,215 | 8/1991 | Hadfield | 358/213.11 |
| 5,040,070 | 8/1991 | Higashitsutsumi et al. | 358/213.13 |
| 5,047,861 | 9/1991 | Houchin et al. | 358/213.15 |
| 5,389,968 | 2/1995 | Koyanagi et al. | 348/222 |

FOREIGN PATENT DOCUMENTS

| | | | |
|---|---|---|---|
| 61-59975 | 3/1986 | Japan | H04N 5/225 |
| 61-18747 | 8/1986 | Japan | H04N 5/335 |

Primary Examiner—Andrew Faile
Assistant Examiner—Tuan V. Ho
Attorney, Agent, or Firm—Lyon & Lyon

[57] ABSTRACT

A video camera of the type in which the camera head is detached from the camera control unit, and coupled to the same with a cable is provided. The driving circuitry for the imager is situated at the camera head. Compensation circuitry is included to adjust the phase relationship between the timing signals passed to and from the camera control unit over the cable to at least partly compensate for delay through the cable.

23 Claims, 5 Drawing Sheets

REMOTE IMAGER VIDEO CAMERA CABLE COMPENSATION CIRCUITRY

This is a continuation of application Ser. No. 07/951,123, filed Sep. 25, 1992, now abandoned.

BACKGROUND

I. Field of the Invention

This invention relates generally to the field of video cameras, and more specifically, to video cameras of the type in which the camera head is detached from the camera control unit and coupled to the same via a cable.

II. Background of the Invention

Over the past 15 years, very small lightweight video cameras for use in both industrial and medical applications have become available. In medical applications, these cameras attach to the eyepiece of an optical instrument called an endoscope so that a physician can observe on a television monitor what formerly was viewed directly at the eyepiece. With a diameter of from 5 to 10 mm., endoscopes are passed into body cavaties through small holes to observe structures and perform procedures previously requiring large surgical openings.

These cameras typically comprise a camera head, which contains the imager (typically a CCD), and a camera control unit containing the control and video processing circuitry. The camera head is detached from the camera control unit and coupled to the same via a cable, and this enables the camera head alone to be attached to the endoscope. The object is to provide a camera head/endoscope combination which is very lightweight and easy for a surgeon to manipulate.

Such a camera begins operation when the imager receives timing pulses from the control and video processing circuitry to scan its picture element ("pixel") locations and generate an image signal containing the image information. In the case of a CCD, for example, nearly 400,000 pixels must be scanned. While generating the image signal, the imager typically combines the same with a timing signal to generate a composite signal, which is then passed to the control and video processing circuitry via the cable. The control and video processing circuitry then extracts the image, or pre-video signal from the composite signal, and processes the same to generate one or more signals for inputting to and driving a display such as a video monitor. However, for the control and video processing circuitry to successfully extract the image signal from the composite signal, the effects of the cable must be compensated for.

One way to attempt compensation is for a user to manually adjust the amplitude and/or phase of the outgoing timing signal (outgoing from the perspective of the control and video processing circuitry) to compensate for the precise cable length, cable material characteristics, and the transit times of the imager and control and video processing circuitry after all the components of the system have been assembled. However, this approach is undesirable for mass production and intolerant of changes that may occur over time in the circuit or cable elements due to component drift.

A second way to attempt compensation is to utilize the analog compensation circuitry described in U.S. Pat. No. 4,860,095, Kimura et al., which is hereby fully incorporated by reference herein as though set forth in full. According to this approach, CCD driving signals are generated in the control and video processing circuitry and passed to the CCD by means of the cable. To compensate for the decay in these signals which would otherwise occur in the cable, level correction circuitry is provided to appropriately adjust the amplitude of the driving signals before the same are sent over the cable. To compensate for the delay of these signals which would otherwise be caused by the cable, a phase-locked loop is provided to continuously maintain a constant phase relationship between the driving signals, and the composite signal.

However, this approach suffers from the instability that plaques classic phase-locked loops. It is also complex because of the large number of signal lines in the cable and the level correction circuitry required for transmitting the driving signals to the CCD.

Accordingly, it is an object of the subject invention to provide a video camera of the type in which the camera head is detached from the camera control unit and coupled to the same via a cable, which overcomes the disadvantages of the prior art. Additional advantages and objects will be set forth in the description which follows, or will be apparent to those of ordinary skill in the art who practice the invention.

SUMMARY OF THE INVENTION

To achieve the foregoing objects and advantages, and in accordance with the purpose of the invention as embodied and broadly described herein, there is provided a video camera comprising: a camera control unit for providing a first timing signal; a camera head including an imager for providing a composite signal, comprising a second timing signal and an image signal, responsive to at least one driving signal, the first and second timing signals having a phase relationship; driving circuitry situated within the camera head for providing the at least one driving signal which is responsive to the first timing signal; a cable including at least one signal line for conveying the first timing signal from the camera control unit to the driving circuitry within the camera head, and the composite signal to the camera control unit; and compensation circuitry for adjusting the phase relationship between the first timing signal and the second timing signal to at least partly compensate for delay through the cable. A related method is also provided.

DESCRIPTION OF THE PREFERRED EMBODIMENTS

Figure 1:
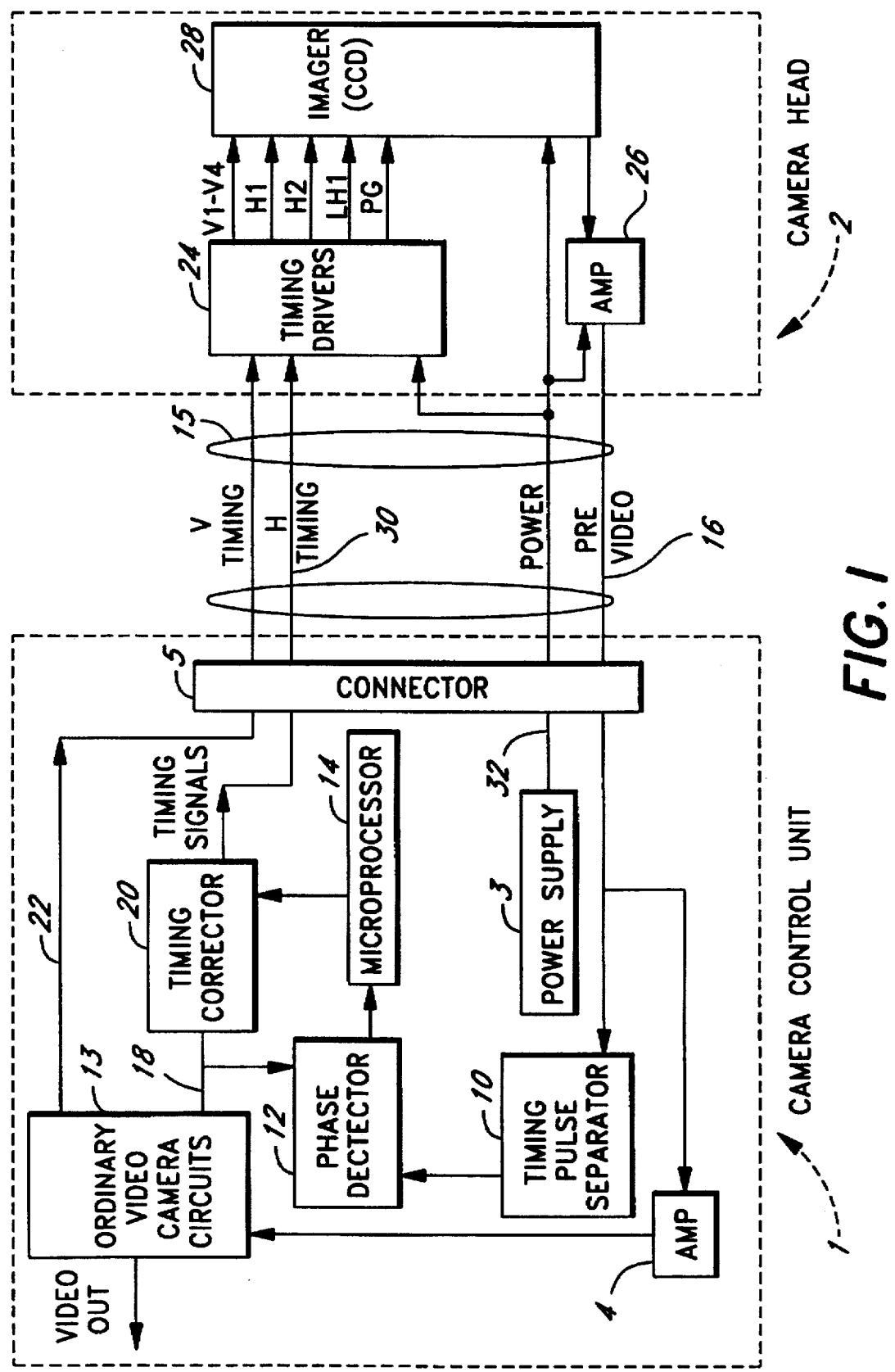
FIG. 1 is a block diagram of a first embodiment of the subject invention.

With reference to FIG. 1, a first embodiment of the subject invention comprises camera control unit 1 coupled to camera head 2 by means of cable 15. The camera control unit, in turn, comprises control and video processing circuitry 13, timing corrector 20, phase detector 12, microprocessor 14, and timing pulse separator 10. Power supply 3, amp. 4, and connector 5 are also included as shown. The power supply is used to provide power 3 to the camera head 2 by means of signal line 32, and will not be further described.

The camera head comprises driving circuitry 24, imager 28 (typically a CCD), and amp. 26.

Control and video processing circuitry 13 generates V and H timing signals on signal lines 22 and 18, respectively. In this embodiment, the V timing signals are sent directly to connector 5, and from there, to the camera head over cable 15 without alteration, but the H timing signals, typically having a frequency of 14.3 MHz., are first passed through timing corrector 20. Timing corrector 20 delays the H timing signals by a predetermined amount, obtained from microprocessor 14, and outputs the same on signal line 30. Once delayed, the H timing signals are sent to the connector 5, and from there to the camera head 2 over cable 15.

Once they have passed over the cable, the V and H timing signals are received by driving circuitry 24, which generates the V1–V4, H1, H2, LH1, and PG driving signals required to drive CCD 28. (In some cases, the V timing signals can be coupled directly to the CCD without passing through the driving circuitry first). Since the driving signals are generated remotely at the camera head, and are not transmitted over the cable, the need for level correction circuitry to adjust the amplitude of the same for anticipated delay over the cable is avoided. In addition, the numerous signal lines which would otherwise be required to transmit the driving signals over the cable are also avoided.

CCD 28, in turn, generates a composite signal, responsive to the driving signals, which comprises an image signal and a reset timing signal, typically also at a frequency of 14.3 MHz., combined together.

The composite signal is sent to amp. 26, typically a common emitter current amp., which amplifies and drives the composite signal back over the cable 15 by means of signal line 16, to timing pulse separator 10, and amp. 4 within the camera control unit 1.

At the camera control unit, timing pulse separator 10 separates the reset timing signal from the composite signal, and conveys the reset timing signal to phase detector 12. Phase detector 12 compares the phase between the H timing signals generated by the control and video processing circuitry 13 and the reset timing signal extracted from the composite signal, and outputs the phase difference to the microprocessor 14. The microprocessor 14, in conjunction with the timing corrector 20, monitors the phase difference and iteratively delays the outgoing H timing signals until the detected phase difference between the incoming and outgoing timing signals is at a minimum, preferably 0 degrees. The microprocessor then stores the delay amount which minimizes the phase difference for subsequent use. (In the subsequent discussion, this amount will be referred to as the "optimal" delay amount, but it should be appreciated that other ways of determining this amount are possible and are intended to be covered by this term, such as when the phase difference is at a fixed positive or negative value).

Advantageously, the microprocessor 14 only determines the optimal delay amount once or at selected intervals under controlled conditions such as when the system is first energized, since, at this point, the reset timing signal coming from the timing pulse separator 10 is known to be of high quality, and unaffected by image information. Indiscriminate or continuous determination of the delay amount can be problematic, since the quality of the reset timing signal can be poor during vertical and horizontal retrace periods, and when the CCD is exposed to transient high light levels.

As stated, once determined, the microprocessor 14 stores the optimal delay amount, and uses the same thereafter to delay the outgoing H timing signals throughout the remainder of the surgical procedure or a selected period thereof. In this way, the circuitry avoids the instability that plagues classic analog approaches utilizing phase-locked loops, which determine and adjust continuously for phase differences.

As previously stated, the composite signal is also sent to amp. 4 within the camera control unit 1. Amp. 4 amplifies the composite signal, and conveys the same to the control and video processing circuitry 13. Sample and hold circuitry therein then samples the amplified composite signal responsive to timing pulses synchronous with the outgoing H timing signals. Since those signals are, in the manner just described, caused to be synchronous with the reset signal portion of the composite signal, the sample and hold circuitry will be able to sample the composite signal at the appropriate time to extract the image signal. The control and video processing circuitry 13 then performs additional processing on the image signal to derive the video signal which is used to directly drive a display device such as a video monitor.

Figure 2:
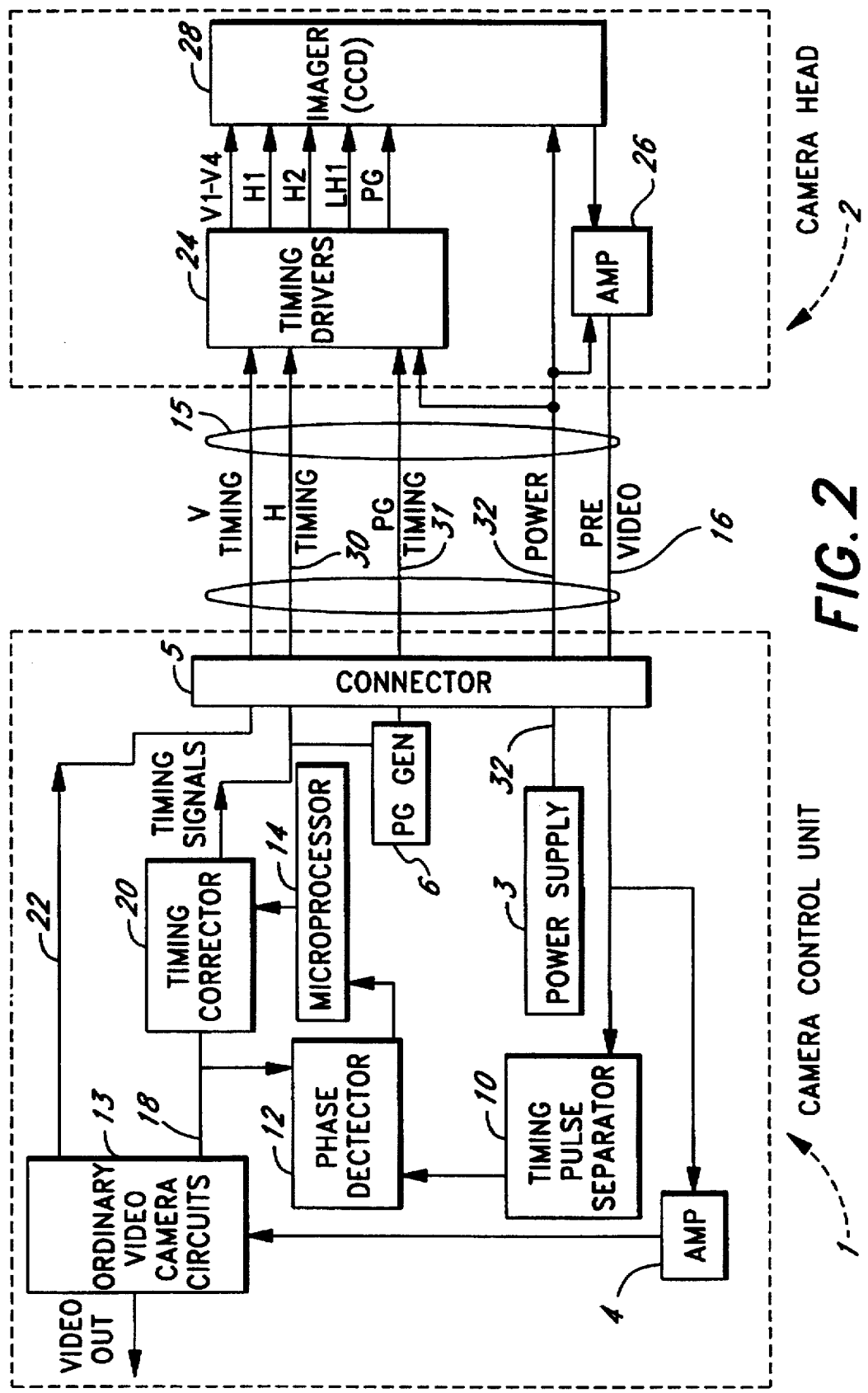
FIG. 2 is a block diagram of a second embodiment of the subject invention.

A second embodiment of the subject invention is illustrated in FIG. 2, in which, compared with FIG. 1, like elements are referenced with like reference numerals. This embodiment is very similar to the first, except that PG generator 6 is added within the camera control unit 1, and an extra signal line, referenced with identifying numeral 31, is added to the cable 15.

PG generator 6 generates a PG timing signal from the delayed H timing signals coming from the timing corrector. The PG timing signal is then conveyed to the connector 5, and from there, to the driving circuitry 24 by means of signal line 31 in the cable 15. This embodiment slightly reduces the number of components at the camera head because less circuitry is required there to generate the PG driving signal. On the other hand, it does so at the expense of an extra signal line in the cable 15. Otherwise, this embodiment is identical to the first.

Figure 4:
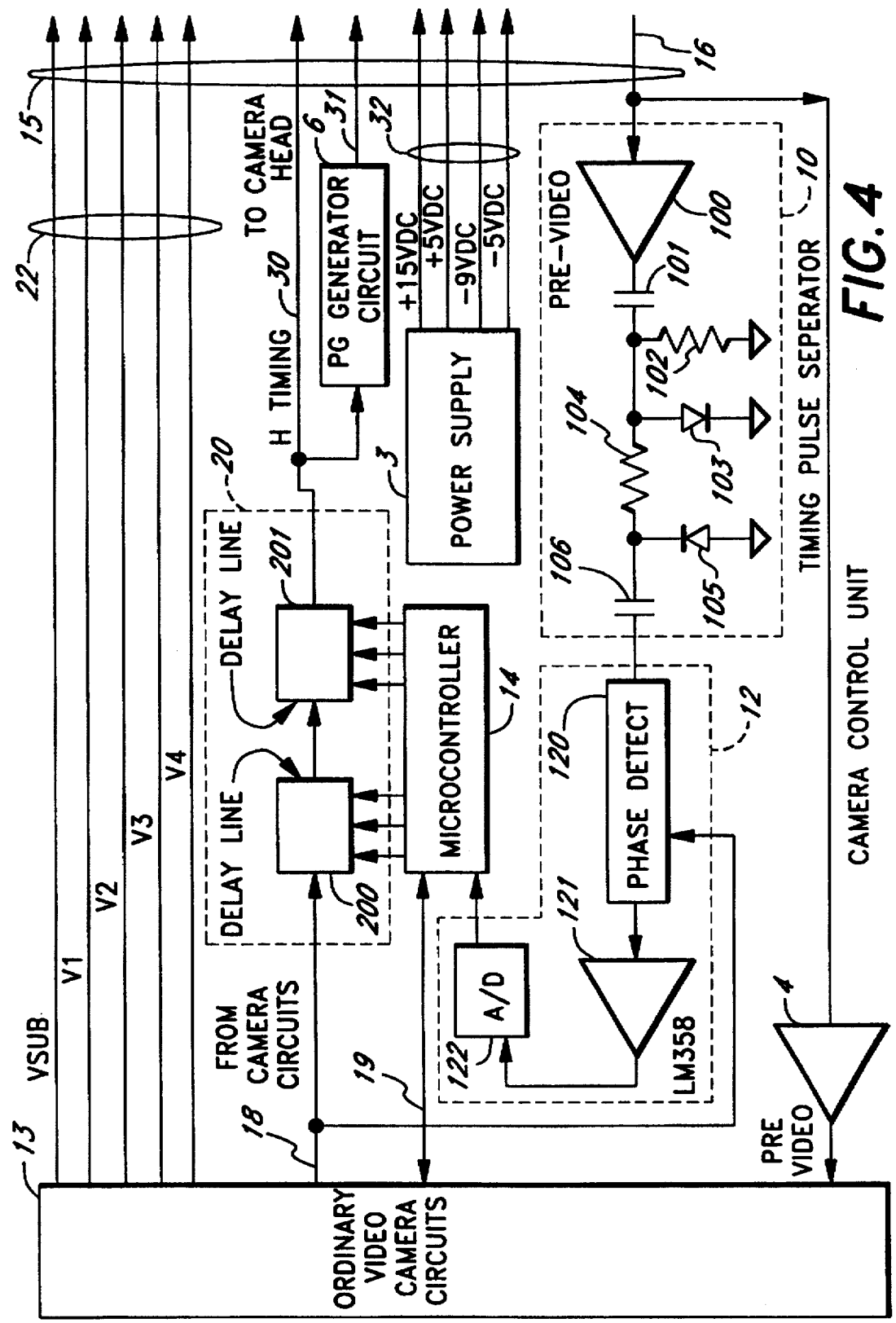
FIG. 4 is a block diagram of the camera control unit in the second embodiment of the subject invention.

A detailed diagram of the camera control unit of FIG. 2 is illustrated in FIG. 4, in which, compared with FIG. 2, like elements are referenced with like identifying numerals. As shown, microprocessor 14 is advantageously a Motorola MC68HC705C4FN microcontroller, and timing corrector 20 advantageously comprises two PCA Electronics programmable delay lines (part nos. 1888 and 1889), one with a 2 nsec. step delay, and the other, with a 10 nsec. step delay, the combination achieving a 2 nsec. resolution for the delay. In this particular implementation, the timing corrector 20 is configured to compensate for an approximate round-trip delay of 30 nsec. through a 10 ft. cable (15 nsec. each way) and another 15 nsec. transit time through cable driver circuits.

As shown, phase detector 12, in this implementation, comprises a Signetics 74HC4046A phase detector, identified with reference numeral 120, buffer amplifier 121, and A/D converter 122. The output of phase detector 120 connects through the buffer amplifier 121 to the A/D converter 122, and then to the microcontroller 14.

Timing pulse separator 10 comprises buffer amplifier 100, capacitor 101 (advantageously 0.001 uF.), resistor 102 (advantageously 33 Kohm), diodes 103 and 105, resistor 104 (advantageously 200 ohm), and capacitor 106 (advantageously 0.1 uF.). The operation of timing pulse separators such as these are known in the art, and will not be further described.

Microcontroller 14 is coupled to the control and video processing circuitry 13 by means of signal line 19, which is advantageously a bi-directional serial connection. The purpose of this connection is to ensure that the microcontroller 14 determines the optimal delay amount at the appropriate time, i.e., at start-up, for the reasons previously described. Once determined, the optimal delay amount is held in the microcontroller memory for use in delaying the outgoing timing signals until the value is updated, or until the surgical procedure is completed.

As discussed previously, the V timing signals, in this case, VSUB, V1, V2, V3, and V4, are conveyed directly to the CCD 28 by means of signal lines 22. The H timing signals are passed through timing corrector 20 by means of signal line 18, and from there, to the driving circuitry 24 in the camera head 2 by means of signal line 30. The H timing signals are also conveyed to PG generator 6, which derives the PG timing signal from the H timing signals, and conveys the same to the driving circuitry 24 in the camera head by means of signal line 31. Power supply 3 provides +15 VDC, 5 VDC, −9 VDC, and −5 VDC signals, and conveys the same to the camera head 2 by means of signal lines 32. The composite signal from the camera head 2 is conveyed to the camera control unit 1 by means of signal line 16.

Figure 3A:
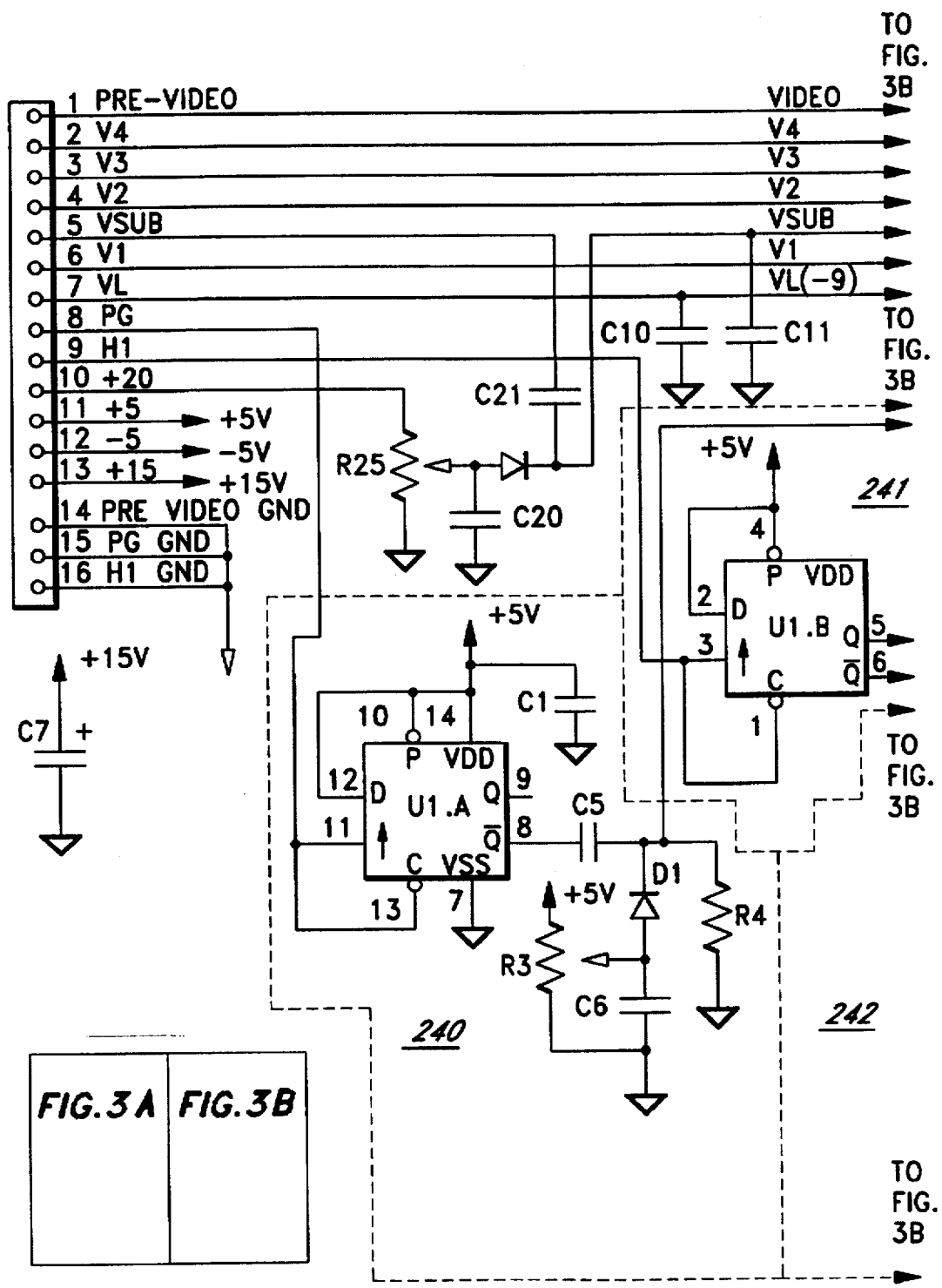
FIG. 3 is a detailed schematic of the camera head in the second embodiment of the subject invention.
Figure 3B:
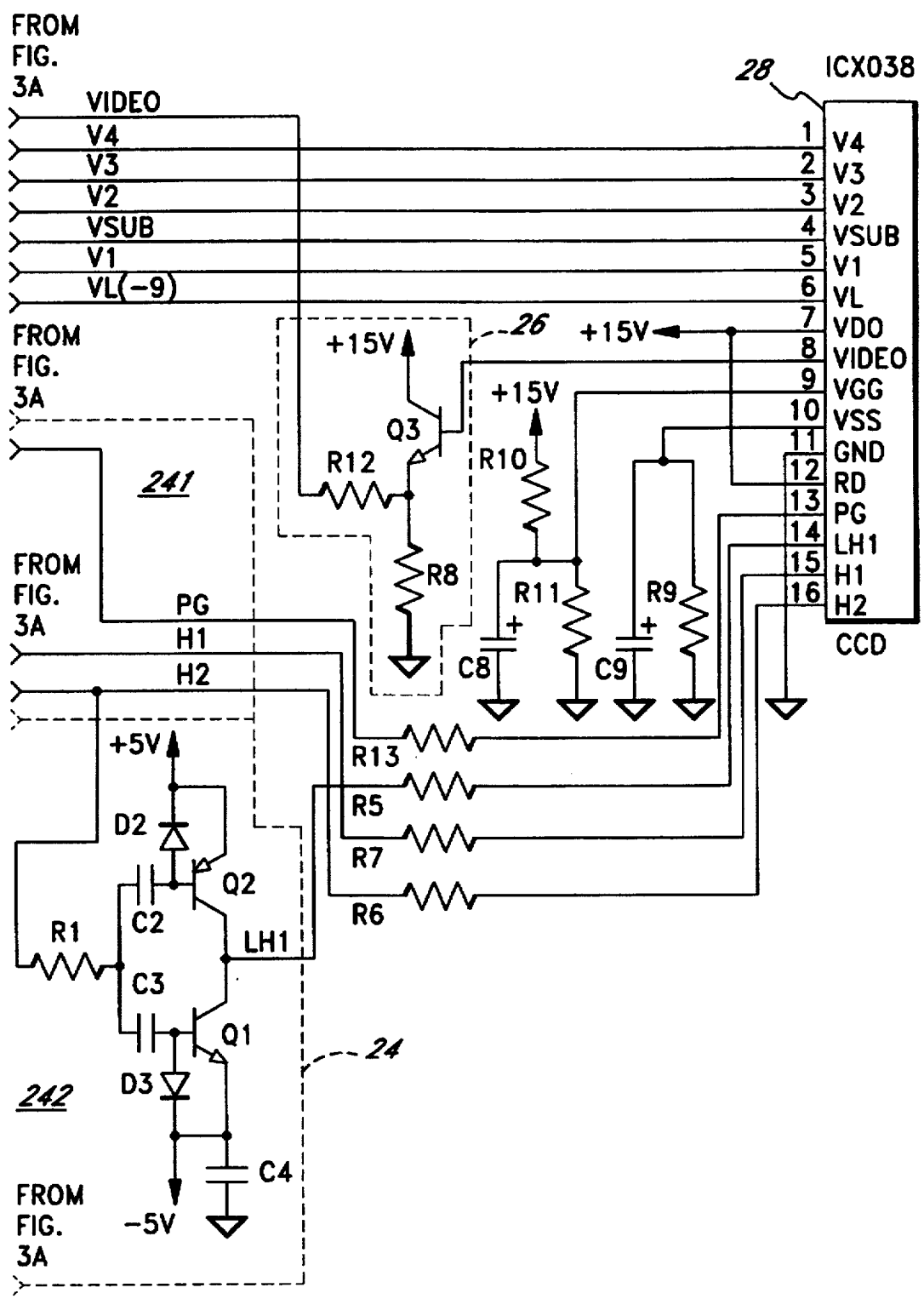

Turning to FIG. 3, that figure is a detailed schematic of the camera head 2 of FIG. 2. Connector 7 is the point where the cable 15 attaches to the camera head 2. As shown, the V timing signals, VSUB, V1–V4, are provided on pins 2–6 of the connector 7, and from there, are passed directly to pins 1–5 of CCD 28, which is advantageously a Sony ICX038 CCD. The −9 VDC signal from the power supply, known in the art as VL, is received at pin 7 of the connector 7, and passed directly to pin 6 of the CCD 28. The H and PG timing signals are received respectively at pins 9 and 8 of the connector 7, and from there, are conveyed to driving circuitry 24. Driving circuitry 24, in turn, buffers, amplifies, and processes the same to obtain the PG, H1, H2, and LH1 driving signals (which are known in the art), and passes the same (through resistors R5, R6, R7, and R13) to pins 13–16 of the CCD 28.

Driving circuitry 24, as shown, comprises PG driving circuitry 240, H1/H2 driving circuitry 241, and LH1 driving circuitry 242. The PG driving circuitry 240 comprises U1A, a flip-flop, and associated circuitry, comprising R3, R4, C5, C6, and D1, which provides the proper DC bias. The H1/H2 driving circuitry 241 comprises U1B, also a flip-flop. As stated, this circuitry produces the H1 and H2 driving signals, which, as can be seen from the figure, are inverted forms of each other. The LH1 driving circuitry 242 comprises Q1 and Q2, R1, D2–D3, and C2–C4, coupled together as shown. Amp. 26 is a common emitter amplifier comprising Q3, R8, and R12. The remaining circuitry shown in FIG. 3 is common to most, if not all, CCD implementations, and need not be further explained here.

While embodiments and applications of this invention have been shown and described, it should be apparent to those of ordinary skill in the art that many more embodiments are possible without departing from the spirit and scope of the subject invention. Accordingly, the invention is not to be restricted, except as by the appended claims.

What is claimed is:

1. A video camera, comprising:

a camera control unit for providing a first timing signal;

a camera head positioned remotely from the camera control unit and coupled thereto by a cable, the camera head including an imager for providing, responsive to at least one driving signal, a composite signal, the composite signal comprising a second timing signal and an image signal, the first and second timing signals having a phase relationship;

driving circuitry situated within the camera head for providing the at least one driving signal responsive to the first timing signal;

the cable including at least one signal line for conveying the first timing signal from the camera control unit to the driving circuitry within the camera head, and the composite signal to the camera control unit; and compensation circuitry coupled to or included within the camera control unit, and also coupled to the imager, for adjusting throughout a time period having a duration the phase relationship between the first timing signal and the second timing signal by a pre-determined value to at least partly compensate for delay through the cable, wherein the pre-determined value is kept fixed for the duration of the time period.

2. The camera of claim 1 wherein the compensation circuitry includes a storage device for storing the pre-determined value throughout the time period.

3. The camera of claim 2 wherein the compensation circuitry is adapted to use the pre-determined value throughout a remainder of a surgical procedure.

4. The video camera of claim 1, further comprising an endoscope attached to the camera head.

5. A video camera, comprising:

a camera control unit for providing a first timing signal;

a camera head positioned remotely from the camera control unit and coupled thereto by a cable, the camera head including an imager for providing, responsive to at least one driving signal, a composite signal, the composite signal comprising a second timing signal and an image signal, the first and second timing signals having a phase relationship;

driving circuitry situated within the camera head for providing the at least one driving signal responsive to the first timing signal;

the cable including at least one signal line for conveying the first timing signal from the camera control unit to the driving circuitry within the camera head, and the composite signal to the camera control unit; and compensation circuitry coupled to or included within the camera control unit, and also coupled to the imager, for adjusting the phase relationship between the first timing signal and the second timing signal by a value to at least partly compensate for delay through the cable, wherein the compensation circuitry comprises a microprocessor for determining the value, a storage device coupled to or included within the microprocessor for storing the value, and a programmable delay device coupled to the microprocessor and responsive to the value for adjusting the phase relationship.

6. The camera of claim 5 wherein the compensation circuitry further comprises a timing pulse separator for separating the second timing signal from the composite signal, and a phase detector for determining the phase relationship between the first timing signal and the second timing signal, and the microprocessor in conjunction with the programmable delay device are configured to iteratively determine the value while monitoring the phase relationship determined by the phase detector.

7. A method for at least partly compensating for delay through a cable in a video camera including a camera control unit and a camera head positioned remotely from the camera control unit and coupled thereto by the cable, the method comprising the steps of:

generating a first timing signal in the camera control unit;

generating in the camera head, responsive to the first timing signal, a composite signal, comprising an image signal and a second timing signal, the first and second timing signals having a phase relationship;

passing the composite signal through the cable to the camera control unit;

determining during a first time period a value;

storing the value throughout a second time period different from the first time period, the second time period having a duration, such that the value is fixed for the duration of the second time period; and adjusting, throughout the second time, the phase relationship between the first timing signal and the second timing signal by the value to at least partly compensate for delay through the cable.

8. The method of claim 7 further comprising iteratively determining the value while monitoring the phase relationship between the first and second timing signals.

9. The method of claim 7 further comprising selecting the first time period to be when the second timing signal is of high quality.

10. The method of claim 7 further comprising selecting the first time period to be at the beginning of a surgical procedure.

11. The method of claim 10 further comprising selecting the second time period to be during the remainder of the surgical procedure.

12. The method of claim 7 further comprising determining the value responsive to the phase relationship.

13. A camera control unit adapted for use with a solid state imager which is remotely coupled to the control unit by a cable and is also coupled to driving circuitry, wherein the driving circuitry receives a first timing signal generated in the control unit, and provides at least one driving signal to said imager, and said imager provides, responsive to said at least one driving signal, to said control unit, a composite signal including an image signal and a second timing signal, the first and second timing signals having a phase relationships the camera control unit comprising:

control circuitry for providing the first timing signal; and compensation circuitry, coupled to the control circuitry and adapted to be coupled to the solid state imager, for adjusting the phase relationship between the first timing signal and the second timing signal by a value to at least partly compensate for delay through the cable, the compensation circuitry comprising;

a processor for determining the value; and a device coupled to the processor and responsive to the value for adjusting the phase relationship.

14. The camera control unit of claim 13 wherein the processor is configured to determine the value at a time when the second timing signal is known to be of high quality.

15. The camera control unit of claim 14 wherein the processor is configured to determine the value at the beginning of a surgical procedure.

16. The camera control unit of claim 13 wherein the compensation circuitry further comprises a storage device coupled to or included within the processor for storing the value.

17. A camera control unit adapted for use with a solid state imager which is remotely coupled to the control unit by a cable and is also coupled to driving circuitry, wherein the driving circuitry receives a first timing signal generated in the control unit, and provides at least one driving signal to said imager, and said imager provides, responsive to send at least one driving signal, to said control unit, a composite signal, including an image signal and a second timing signal, the camera control unit comprising:

control circuitry for providing the first timing signal; and compensation circuitry, coupled to the control circuitry and adapted to be coupled to the solid state imager, for adjusting the phase relationship between the first timing signal and the second timing signal by a value to at least partly compensate for delay through the cable, the compensation circuitry comprising:

a microprocessor for determining the value; and a programmable delay device coupled to the microprocessor and responsive to the value for adjusting the phase relationship.

18. The camera control unit of claim 17, the compensation circuitry further comprising:

a timing pulse separator for separating the second timing signal from the composite signal; and a phase detector for determining the phase relationship between the first timing signal and the second timing signal;

wherein the microprocessor is configured to determine the value responsive to the phase relationship determined by the phase detector.

19. The camera control unit of claim 18 wherein the microprocessor in conjunction with the programmable delay device is configured to iteratively determine the value while monitoring the phase relationship determined by the phase detector.

20. A video camera, comprising:

a camera control unit for providing a first signal containing timing information;

a camera head positioned remotely from the camera control unit and coupled thereto by a cable, the camera head including an imager for providing, responsive to the first signal, a second signal containing timing information, the timing information in the first and second signals having a phase relationship;

the cable including at least one signal line for conveying the first signal from the camera control unit to the camera head; and compensation circuitry coupled to or included within the camera control unit, and also coupled to the camera head through the cable, for adjusting throughout a time period having a duration the phase relationship between the timing information in the first and second signals by a pre-determined value to at least partly compensate for delay through the cable, wherein the pre-determined value is kept fixed for the duration of the time period.

21. A camera control unit adapted for use with a camera head which is remotely coupled to the control unit by a cable, wherein the camera head receives a first signal containing timing information generated in the control unit, and an imager in the camera head provides, responsive to said first signal, a second signal containing timing information, the timing information in the first and second signals having a phase relationship, the camera control unit comprising:

control circuitry for providing the first signal; and compensation circuitry, coupled to the control circuitry and adapted to be coupled to the imager, for adjusting the phase relationship between the timing information in the first and second signals by a value to at least partly compensate for delay through the cable, the compensation circuitry comprising:

a processor for determining the value; and a device coupled to the processor and responsive to the value for adjusting the phase relationship.

22. A method for at least partly compensating for delay through a cable in a video camera including a camera control unit and a camera head positioned remotely from the camera control unit and coupled thereto by the cable, the method comprising the steps of:

generating a first signal containing timing information in the camera control unit;

generating in the camera head, responsive to the first signal, a second signal containing timing information, the timing information in the first and second signals having a phase relationship;

passing the second signal through the cable to the camera control unit;

determining during a first time period a value;

storing the value throughout a second time period different from the first time period, the second time period having a duration, such that the value is fixed for the duration of the second time period; and adjusting, throughout the second time period, the phase relationship between the timing information in the first and second signals by the value to at least partly compensate for delay through the cable.

23. A camera control unit adapted for use with a camera head which is remotely coupled to the control unit by a cable, wherein the camera head receives a first signal containing timing information generated in the control unit, and an imager in the camera head provides, responsive to said first signal, a second signal containing timing information, the timing information in the first and second signals having a phase relationship, the camera control unit comprising:

control circuitry for providing the first signal; and compensation circuitry, coupled to the control circuitry and adapted to be coupled to the imager, for adjusting throughout a time period having a duration the phase relationship between the timing information in the first and second signals by a pre-determined value to at least partly compensate for delay through the cable, wherein the pre-determined value is kept fixed for the duration of the time period.

* * * * *

UNITED STATES PATENT AND TRADEMARK OFFICE
CERTIFICATE OF CORRECTION

PATENT NO. : 5,696,553
DATED : December 9, 1997
INVENTOR(S) : David A. D'Alfonso, et al.

It is certified that error appears in the above-identified patent and that said Letters Patent is hereby corrected as shown below:

Col. 2, Lines 61-62:
"power supply is" should be changed to --power supply 3 is--

Col. 2, Line 62:
"power 3" should be changed to --power--

Col. 4, Line 50:
after "amplifier 121" insert --(advantageously a 1X, LM358 amplifier)--

Col. 4, Lines 50-51:
after "A/D converter 122" insert --(advantageously an ADC0834 A/D converter)--

Col. 4, Line 54:
after "buffer amplifier 100" insert --(which, like amplifier 4, is advantageously a 5X, CLC406 amplifier)--

Signed and Sealed this

Twenty-fourth Day of March, 1998

Attest:

BRUCE LEHMAN

*Attesting Officer*  *Commissioner of Patents and Trademarks*